Patented Nov. 12, 1940

2,221,032

UNITED STATES PATENT OFFICE 2,221,032

POLYVINYL ACETAL RESIN COMPOSITIONS CONTAINING BUTOXYETHYL BUTOXYACETATE

Donald R. Swan, Rochester, N. Y., assignor to Eastman Kodak Company, Rochester, N. Y., a corporation of New Jersey No Drawing. Application July 13, 1938, Serial No. 219,033

8 Claims. (Cl. 260—36)

This invention relates to plastic compositions, and more particularly to compositions comprising a polyvinyl acetal resin and a conditioning agent.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which can be made into sheets suitable for use in laminated, shatter-proof glass. Still another object is to produce compositions which can be rolled, extruded, molded or otherwise worked into relatively thick sheets and massive plastics. A further object is to produce compositions suitable for use in lacquers, artificial silk filaments, wrapping tissues and the like. Other objects will hereinafter appear.

I have discovered that butoxyethyl butoxyacetate is a very useful conditioning agent for certain of the polyvinyl acetal resins, namely the polyvinyl acetal resins in which a predominating proportion of the acetal groups are acetaldehyde acetal groups or butyraldehyde acetal groups. Not only does it serve as a plasticizer in the accepted sense of the term, increasing the flexibility and toughness of polyvinyl acetaldehyde or butyraldehyde acetal resin films, sheets, or other objects or masses containing it, but when used in amounts of about 45 or more parts per 100 parts of these resins, it has an unusual and remarkable effect which I may call "elasticizing." That is to say, a sheet of polyvinyl acetaldehyde or butyraldehyde acetal resin containing about 45 or more parts of butoxyethyl butoxyacetate per 100 parts of resin possesses the property which, in the rubber industry, is known as "nerve"; namely, the property of stretching to a considerable extent when tension is exerted upon it, and returning to its original dimensions when the tension is released. This property renders such sheets, which I shall call "rubbery" sheets, particularly useful in the manufacture of shatter-proof glass.

Butoxyethyl butoxyacetate has the structural formula $$C_4H_9.O.CH_2.CH_2.OOC.CH_2.O.C_4H_9$$

and can be prepared as follows:

345 grams of butoxyethyl chloroacetate (the chloroacetic acid ester of the monobutyl ether of ethylene glycol) is added slowly, with stirring, to a pasty mass of 192 grams of sodium butylate in butyl alcohol. 250 cc. of benzene is then mixed in, and the mixture is refluxed on the steam bath overnight, the benzene being returned to the reaction mixture in known manner. The resulting mixture is neutralized with 30 grams of glacial acetic acid, the benzene layer separated and discarded, and the product washed with water and with sodium bicarbonate solution, dried over sodium sulfate, and distilled under reduced pressure. The fraction boiling at 105–135° C. at 3 mm. pressure is re-fractionated to give practically pure butoxyethyl butoxyacetate at 130–135° C. at 5 mm. pressure.

For the manufacture of cast films or sheets, the polyvinyl acetal resin and butoxyethyl butoxyacetate may be dissolved in a suitable solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. From about 3 to 100 parts or more of butoxyethyl butoxyacetate per 100 parts of resin may be employed, depending upon the nature of the resin and the purpose for which the sheets are to be used. Suitable proportions of butoxyethyl butoxyacetate for any resin and any purpose may be readily determined by experiment. For the manufacture of sheets suitable for photographic film base, from 3 to 10 parts of butoxyethyl butoxyacetate per 100 parts of resin are suitable. The resin solution is cast as a sheet, the solvent evaporated, and the sheet stripped from the casting surface.

Sheets for use in laminated glass may be formed by casting, or may be made without the use of volatile solvent by extrusion, for example in the manner set forth in application Serial No. 147,934 of John S. Kimble and Ernest C. Blackard, filed June 12, 1937. For instance, 45 or more parts of butoxyethyl butoxyacetate and 100 parts of a polyvinyl acetaldehyde or butyraldehyde acetal resin may be mixed in a suitable jacketed mixer at low temperature, for example 10° C., and the mixture may then be worked on hot rolls, in the manner described in U. S. Patent 2,048,686 of F. R. Conklin, until complete homogenization has taken place. The mass thus produced may then be extruded through an annular die, and the tube so formed slit to form a sheet.

The polyvinyl acetal resins can be prepared by reacting polyvinyl alcohol with an aldehyde in the presence of an acetal condensation catalyst, e. g. a mineral acid. These resins can also be prepared by simultaneously de-esterifying a polyvinyl aliphatic ester and reacting the de-esterification product with an aldehyde in the presence of a de-esterifying catalyst and acetal condensation catalyst. Mineral acids are catalysts for both de-esterification and acetal formation. The polyvinyl acetal resins with which butoxyethyl butoxyacetate is useful include the polyvinyl acetaldehyde acetal resins, the polyvinyl butyraldehyde acetal resins, and the polyvinyl butyraldehyde acetaldehyde mixed acetal resins.

Examples of the preparation of polyvinyl acetaldehyde acetal resins may be found in U. S. Patent 2,044,730, Example 1; U. S. Patent 1,955,068, Example 2; U. S. Patent 2,036,092, Examples 4, 5 and 6; British Patent 466,598, Examples 1, 2, 3, 4 and 7; British Patent 404,279, Examples 1, 2, 4, 5, 6, 7 and 8; U. S. Patent 1,990,399; and French Patent 808,578, Examples 1, 2, and 3. An additional example of the preparation of a polyvinyl acetaldehyde acetal resin is as follows:

100 lbs. of polyvinyl acetate, the viscosity of whose "molar" solution (86.08 g. per liter) in benzene was 45 centipoises, was dissolved in 300 lbs. of 95% ethyl alcohol. To this solution were added 30 lbs. of paraldehyde and 25 lbs. of 35% HCl. The reaction mixture was allowed to stand for 4 days at 40° C., after which it was diluted with ethyl alcohol, and the resin precipitated by pouring into cold water, washed and dried. Analysis showed the resin to have an acetate group content equivalent to 2.1% by weight of polyvinyl acetate and a hydroxyl group content equivalent to 12.9% by weight of polyvinyl alcohol.

Examples of the preparation of polyvinyl butyraldehyde acetal resins may be found in U. S. Patent 2,044,730, Examples 2, 5 and 6; British Patent 466,598, Example 5; French Patent 813,303, Example 1; French Patent 813,514, Examples 1, 2, 3 and 4; and British Patent 459,878; Examples 1, 2, 5, 6, 7, 8, 9 and 10.

An example of the preparation of a polyvinyl butyraldehyde acetaldehyde mixed acetal resin is given in French Patent 813,303, Example 2.

What I claim as my invention and desire to be secured by Letters Patent of the United States is:

1. A composition of matter comprising a polyvinyl acetal resin in which a predominating proportion of the acetal groups are selected from the group consisting of acetaldehyde acetal groups and butyraldehyde acetal groups, and butoxyethyl butoxyacetate as a plasticizer therefor.

2. A transparent, flexible sheet comprising 100 parts of a polyvinyl acetal resin in which a predominating proportion of the acetal groups are selected from the group consisting of acetaldehyde acetal groups and butyraldehyde acetal groups, and, as a plasticizer thereof, from 3 to 10 parts, approximately, of butoxyethyl butoxyacetate.

3. A transparent, rubbery sheet comprising 100 parts of a polyvinyl acetal resin in which a predominating proportion of the acetal groups are selected from the group consisting of acetaldehyde acetal groups and butyraldehyde acetal groups, and at least 45 parts, approximately, of butoxyethyl butoxyacetate as an elasticizer therefor.

4. A composition of matter comprising a polyvinyl acetaldehyde acetal resin and butoxyethyl butoxyacetate as a plasticizer therefor.

5. A transparent, rubbery sheet comprising 100 parts of a polyvinyl acetaldehyde acetal resin and at least 45 parts, approximately, of butoxyethyl butoxyacetate as an elasticizer therefor.

6. A composition of matter comprising a polyvinyl butyraldehyde acetal resin and butoxyethyl butoxyacetate as a plasticizer therefor.

7. A transparent, flexible sheet comprising 100 parts of a polyvinyl butyraldehyde acetal resin and from 3 to 10 parts, approximately, of butoxyethyl butoxyacetate as a plasticizer therefor.

8. A transparent, rubbery sheet comprising 100 parts of a polyvinyl butyraldehyde acetal resin and at least 45 parts, approximately, of butoxyethyl butoxyacetate as an elasticizer therefor.

DONALD R. SWAN.